United States Patent [19]

Nouno

[11] Patent Number: 4,676,203
[45] Date of Patent: Jun. 30, 1987

[54] ROCKER ARM SPRING FOR A VALVE ACTUATING MECHANISM OF AN INTERNAL COMBUSTION ENGINE

[75] Inventor: Yasushi Nouno, Toyota, Japan

[73] Assignee: Toyota Jidosha Kabushiki Kaisha, Aichi, Japan

[21] Appl. No.: 688,812

[22] Filed: Jan. 4, 1985

[30] Foreign Application Priority Data

Jan. 13, 1984 [JP] Japan ................................. 59-3552

[51] Int. Cl.⁴ .............................................. F01L 1/18
[52] U.S. Cl. ................................. 123/90.42; 123/90.44
[58] Field of Search ............... 123/90.39, 90.41, 90.42, 123/90.44, 90.45, 90.46; 267/47, 158, 164

[56] References Cited

U.S. PATENT DOCUMENTS

| 3,563,215 | 2/1971 | Ross | 123/90.42 |
| 4,420,141 | 12/1983 | Goloff | 267/158 X |

FOREIGN PATENT DOCUMENTS

| 1076441 | 2/1960 | Fed. Rep. of Germany | 123/90.42 |
| 875350 | 8/1961 | United Kingdom | 123/90.42 |
| 963995 | 7/1964 | United Kingdom | 123/90.39 |
| 816174 | 7/1959 | United Kingdom | 123/90.41 |
| 1437567 | 5/1976 | United Kingdom | 123/90.39 |
| 2091379 | 7/1982 | United Kingdom | 267/158 |
| 2115068 | 9/1983 | United Kingdom | 123/90.44 |

Primary Examiner—William R. Cline
Assistant Examiner—Peggy Neils
Attorney, Agent, or Firm—Kenyon & Kenyon

[57] ABSTRACT

A rocker arm spring particularly adapted for use in a valve actuating mechanism of the type wherein a rocker arm is mounted to the cylinder head by means of a universal pivot and wherein an overhead cam shaft engages from above an intermediate section of the rocker arm. The universal pivot (28) includes a support socket (30) and a pivotable shaft (40), with a part-spherical convex lower end (48) of the shaft (40) received in a part-spherical concave bearing surface (38) of the support socket (30). The rocker arm spring (50) has an upper arm (56) engaging the rocker arm (24) and a lower arm (58) engaging the socket (30). The rocker arm spring (50) holds the shaft (40) and the socket (30) together without play and serves to bias the free end of the rocker arm (24) in contact with the stem of the intake or exhaust valve (12). The upper arm (56) of the spring (50) has side edges (66, 68) bent down at a right angle along bending lines (X—X, Y—Y) to increase the flexural rigidity of the upper arm.

5 Claims, 6 Drawing Figures

ROCKER ARM SPRING FOR A VALVE ACTUATING MECHANISM OF AN INTERNAL COMBUSTION ENGINE

BACKGROUND OF THE INVENTION (1) Field of the Invention

The present invention relates to a rocker arm spring for use in a valve actuating mechanism of an internal combustion engine and, more particularly, to a rocker arm spring for a valve actuating mechanism of the type which comprises an overhead cam shaft and wherein a rocker arm is swingably supported on the cylinder head of the engine through a universal pivot.

(2) Description of the Related Art

A valve actuating mechanism for an internal combustion engine is known which comprises a rocker arm swingably supported at an end on the cylinder head by means of a universal pivot and wherein an overhead cam shaft engages the mid portion of the rocker arm to operate an intake or exhaust valve of the engine (see, for example, British Patent Specification No. 875,350, published Aug. 16, 1961; U.S. Pat. No. 3,563,215, granted to Ross on Feb. 16, 1971; and British Patent Specification No. 1,437,567, published May 26, 1976). The universal pivot comprises a part-spherical socket formed in an end of the rocket arm, the socket receiving a part-spherical head of a fulcrum stud. A spring clip assembly in the form of a hairpin spring is used to hold the socket in contact with the stud head.

British Patent Specification No. 963,995, published July 15, 1964, discloses another type of valve gear arrangement in which an end of the rocker arm is also supported by a universal pivot. The universal pivot comprises a support socket mounted on the cylinder head and having a part-spherical concave bearing surface, and a pivotable shaft adjustably mounted to the rocker arm and having a part-spherical convex lower end engaging with and resting on the bearing surface of the support socket. As shown in FIG. 3 of this British patent, the valve gear arrangement includes a rocker arm spring in the form of a leaf spring having a loop configuration, the end of the upper arm of which is clamped to the rocker arm. The lower arm of the leaf spring is clamped to the support socket. The leaf spring serves to take up any play in the universal pivot and to hold the rocker arm in contact with the valve stem.

In the valve actuating mechanism mentioned above however, the rigidity of the upper arm of the rocker arm spring is insufficient to preclude any excessive flexural movement thereof, because the spring is made of a flat sheet of spring steel bent into a U-shaped cross-section. Thus, there is a likelihood of the upper arm vibrating in resonance with the swinging movement of the rocker arm, so that a node of vibration is formed at a certain localized area of the upper arm, thereby resulting in failure of the spring at that area.

SUMMARY OF THE INVENTION

The primary object of the present invention is to provide a rocker arm spring for use in the valve actuating mechanism of the type mentioned, with an upper arm having an increased flexural rigidity.

Another object of the present invention is to provide a rocker arm spring having a minimum width as measured in the transverse direction.

This invention provides a rocker arm spring for use in a valve actuating mechanism of an internal combustion engine. The valve actuating mechanism includes a rocker arm and an overhead cam shaft. The rocker arm is swingably supported at its end on the cylinder head by a universal pivot comprising a support socket mounted to the cylinder head and a pivotable shaft mounted to an end of the rocker arm. The other end of the rocker arm is engageable with a valve stem of an intake or exhaust valve of the engine. The support socket has a part-spherical concave bearing surface which pivotably receives a corresponding part-spherical convex end of the pivotable shaft. The rocker arm spring is made of a substantially U-shaped leaf spring partly encircling the end of the rocker arm and is provided with a lower arm engageable with the support socket and an upper arm engageable with the rocker arm. According to the present invention, the rocker arm spring is characterized in that the side edges of the upper arm are bent down at roughly a right angle along substantially longitudinally extending bending lines. The bent edges provide reinforcement of the upper arm and increase the flexural rigidity.

According to another feature of the invention, the upper arm of the rocker arm spring has an aperture for passing therethrough the pivotable shaft, and the end of the rocker arm and the bending lines along which the side edges are bent are located adjacent to the periphery of the aperture. This arrangement considerably reduces the transverse width of the rocker arm and thus enables a reduction in the longitudinal length of the engine thereby minimizing the overall size of the engine.

DESCRIPTION OF THE PREFERRED EMBODIMENT

Figure 1:
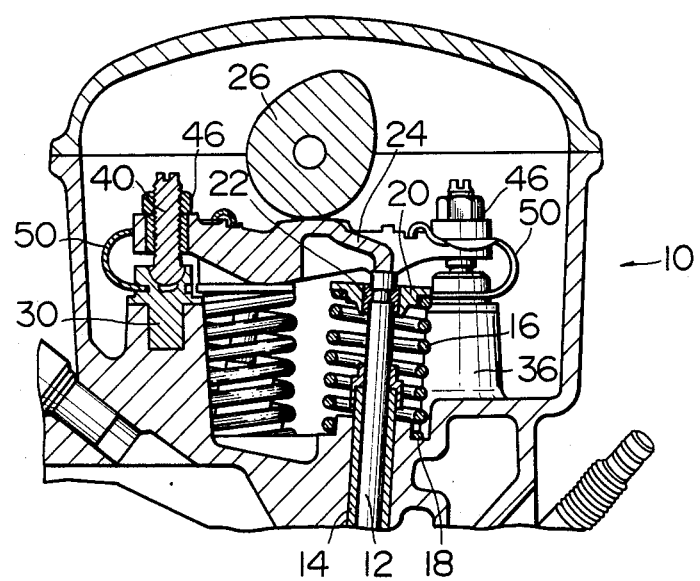
FIG. 1 is a transverse cross-sectional view of a part of the cylinder head of an engine having a valve actuating mechanism provided with the rocker arm spring according to the present invention.

Referring to FIG. 1, there is shown a part of a cylinder head 10 of a multicylinder internal combustion engine. The cylinder head 10 is provided with a plurality of intake or exhaust valves, one of which is shown at 12. As usual, the valve stem of each valve 12 is slidingly received in and guided by a valve guide 14 mounted in the cylinder head 10. A valve spring 16 is provided between a spring seat 18 formed on the upper face of the head 10 and a spring retainer 20 fixed by a split cotter 22 to the upper end of the valve stem. Each valve 12 is biased toward its closed position by the valve spring 16 and is lifted by an associated rocker arm 24 driven by a cam 26 on an overhead cam shaft suitably journaled on the cylinder head 10.

Figure 2:
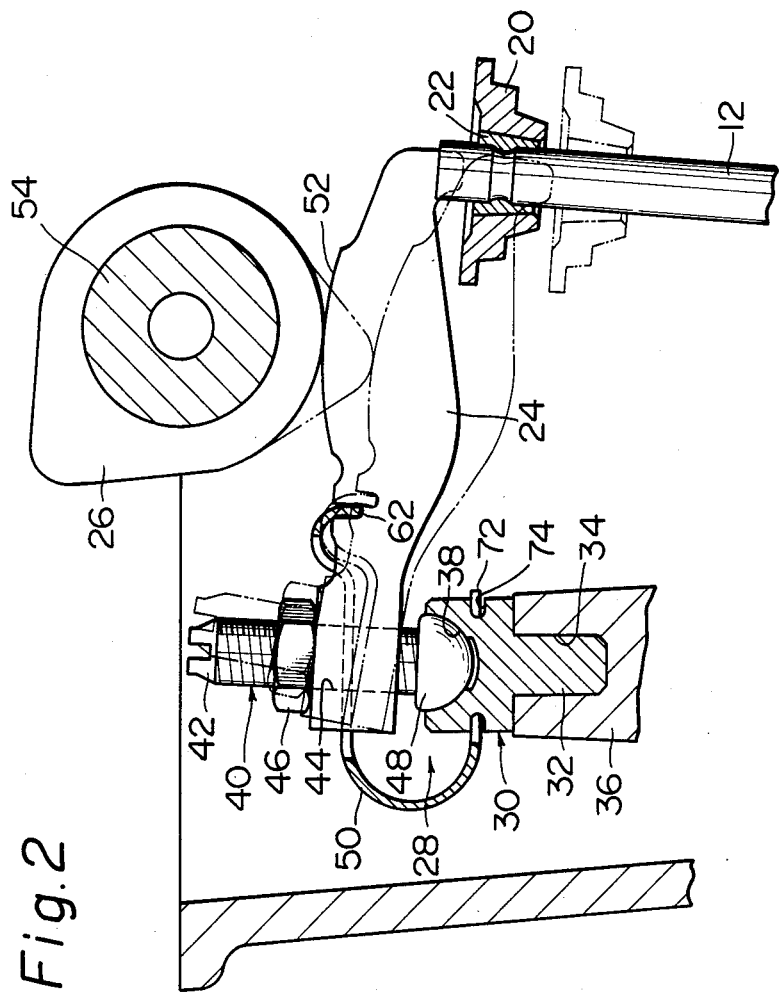
FIG. 2 is an enlarged schematic elevational view, partly cut away, of the valve actuating mechanism shown in FIG. 1.

As best shown in FIG. 2, the rocker arm 24 is swingably supported at its lefthand end, as viewed in FIG. 2, by a universal pivot assembly, generally designated 28.

The universal pivot 28 includes a support socket 30 having a shank portion 32 press-fitted within a bore 34 in a boss 36 of the head 10. The support socket 30 is provided at its head with a part-spherical concave bearing surface 38. A pivotable shaft 40, forming the other part of the universal pivot 28, has a threaded shank portion 42 screwed into an internally threaded bore 44 formed in the lefthand end of the rocker arm 24 and is fixed in position by a lock nut 46. The pivotable shaft 40 has a part-spherical convex lower end portion 48 mating with and received in the concave bearing surface 38 of the socket 30. A rocker arm spring 50, to be described later in more detail with reference to FIGS. 4 through 6, serves to hold the pivotable shaft 40 and the socket 30 together, as well as to urge the righthand end of the rocker arm 24 into contact with the top of the valve stem. The rocker arm 24 is provided with a pad portion 52 in sliding contact with the cam 26 of the overhead cam shaft 54. As the cam shaft 54 rotates, the nose portion of the cam 26 is brought into contact with the pad portion 52 causing the rocker arm 24 to swing about the center of the universal pivot 28 as shown by the phantom line in FIG. 2, thereby lifting the intake or exhaust valve 12. The tappet clearance of the valve actuating mechanism may be adjusted by releasing the lock nut 46 and turning the pivotable shaft 40 in either direction.

Figure 3:
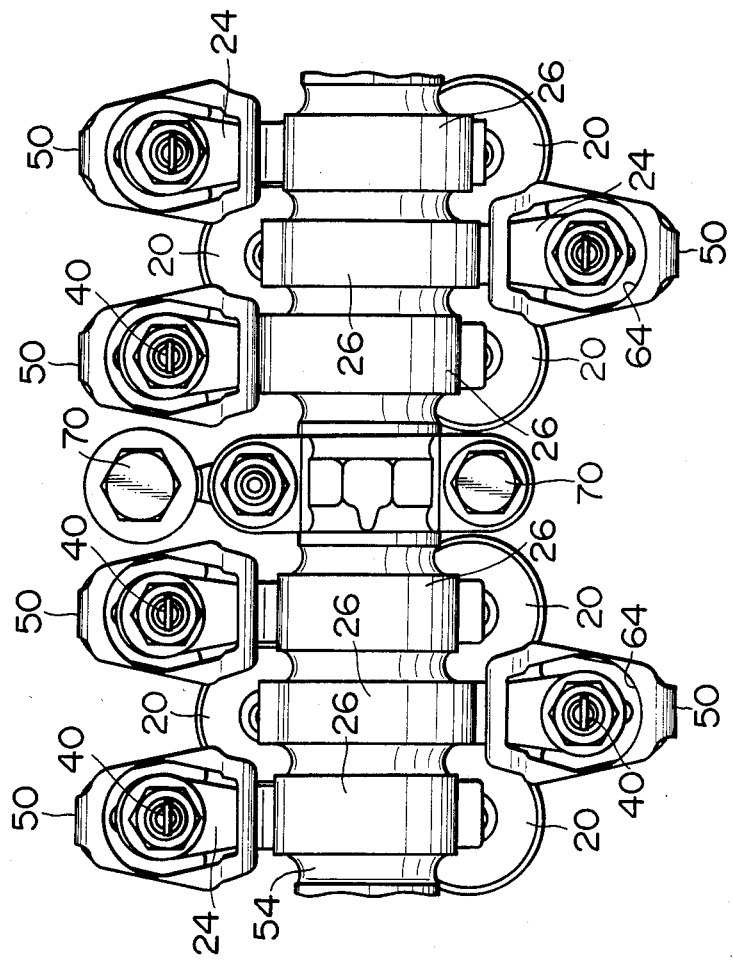
FIG. 3 is a top plan view of the valve actuating mechanism shown in FIG. 1.

As can be understood from FIG. 3, in the illustrated example, each cylinder has two intake valves and one exhaust valve. To this end, the cam shaft 54 is provided for each cylinder with three cams 26 respectively engaging with associated rocker arms. However, the number of valves may be altered depending on the engine design.

Figure 4:
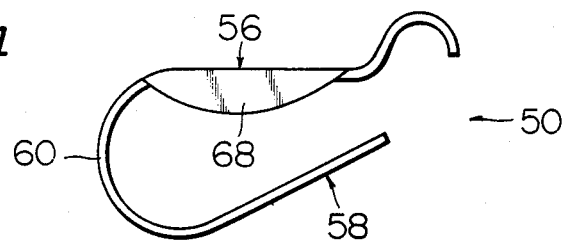
FIG. 4 is an elevational view of the rocker arm spring according to the present invention.
Figure 5:
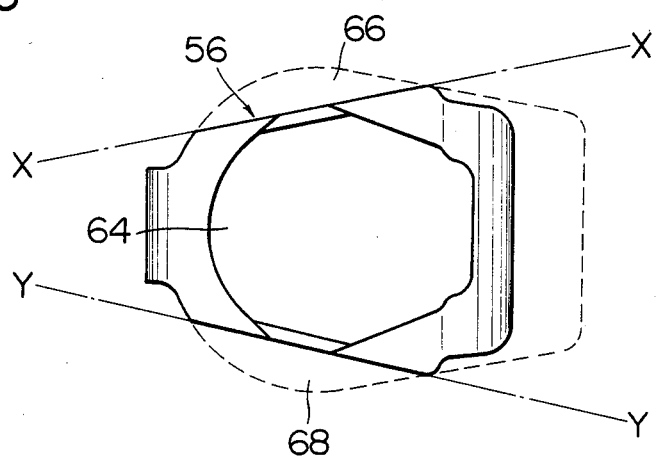
FIG. 5 is a top plan view of the rocker arm spring showing the upper arm thereof.
Figure 6:
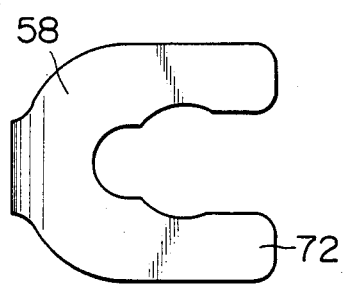
FIG. 6 is a bottom view of the rocker arm spring showing the lower arm.

Referring to FIGS. 4 through 6, the rocker arm spring 50 comprises a roughly U-shaped leaf spring which may be made, for example, by punching a sheet of spring steel into blanks and by stamping and ending the blanks. The rocker arm spring 50 comprises an upper arm section 56 and a lower arm section 58 connected by an arcuate intermediate section 60. In the initial blank, the upper arm section 56 has a configuration as shown by the broken line in FIG. 5. The free end of the upper arm 56 is stamped in a semicircular cross-section as shown in FIG. 4, so that this free end engages within a transverse groove 62 (FIG. 2) of the rocker arm 24. As shown in FIG. 5, the upper ar section 56 has an aperture 64 through which extend the pivotable shaft 40 and the end of the rocker arm 24, as best understood from FIGS. 2 and 3.

As shown in FIG. 5, the side edges 66 and 68 of the upper arm 56 are bent down at a right angle along the bending lines X—X and Y—Y to form a pair of perpendicularly extending sides. Due to the presence of these sides 66 and 68, the flexural rigidity of the upper arm 56 is considerably increased. This causes the intrinsic natural frequency of the upper arm 56 to increase beyond the frequency range at which the rocker arm 24 swings or vibrates during normal operating condition of the engine, thereby avoiding the occurrence of resonant vibration of the upper arm 50. Thus, fatigue life of the rocker arm spring 50 is extended beyond that at which a normal spring will fail.

Additionally, the bending of the side edges 66 and 68 enables the transverse width of the spring 50 to be minimized so that a larger space is available between adjacent rocker arm springs, as best understood from FIG. 3. This facilitates access to cylinder head bolts 70 and also enables the longitudinal length of the engine to be shortened without involving the problem of tools coming in contact or interfering with the springs 50 when the bolts 70 are screwed or unscrewed.

As shown in FIG. 6, the lower arm section 58 of the spring 50 has a forked end 72 which is snap fitted within an annular groove 74 (FIG. 2) of the support socket 30.

What is claimed is:

1. A rocker arm spring for use in a valve actuating mechanism of an internal combustion engine having a cylinder head, an overhead camshaft mounted on the cylinder head, and a valve having a valve stem extending through the cylinder head, the valve actuating mechanism including a rocker arm having a first end and a second end, a universal pivot swingably supporting the first end of the rocker arm on the cylinder head of the engine, the second end of said rocker arm being in contact with the valve stem, and a cam on the overhead camshaft engaging from above a portion of said rocker arm intermediate said first and second ends to cause said rocker arm to swing about said pivot;

said universal pivot including a support socket mounted on said cylinder head the support socket having a part-spherical concave bearing surface, and a pivotable shaft mounted on the first end of the rocker arm, the pivotable shaft having a part-spherical convex end pivotally received in said part-spherical concave bearing surface; and said rocker arm spring being made of an elongated strip of resilient material bent into a substantially U-shaped leaf spring partly encircling said first end of the rocker arm, said spring having a lower arm engageable with said support socket and an upper arm formed with a center portion and a pair of opposite side edges and engageable with said rocker arm for urging said convex end of said pivotable shaft into contact with said bearing surface of said support socket and for biasing said other end of the rocker arm in contact with said valve stem;

said rocker arm spring being characterized in that the opposite side edges of said upper arm are bent at substantially right angles to the central portion along substantially longitudinal bending lines to increase the flexural rigidity of said upper arm such that the inherent natural frequency of said upper arm is increased beyond the frequency range of normal operation of said rocker arm so as to prevent premature failure of the spring due to excessive vibration caused by swinging movement of the rocker arm.

2. A rocker arm spring according to claim 1, wherein said upper arm has an aperture for passing therethrough said pivotable shaft and said one end of said rocker arm, and wherein said bending lines are located adjacent the periphery of said aperture.

3. A rocker arm spring according to claim 1, wherein said upper arm has an aperture for passing therethrough said pivotable shaft and said one end of said rocker arm, and wherein said bending lines are located contiguous to the periphery of the aperture.

4. A rocker arm spring according to claim 1 wherein the lower arm engageable with said support socket comprises a forked end insertable into a circumferential groove in a peripheral surface of said support socket.

5. A valve actuating mechanism of an internal combustion engine having a cylinder head, an overhead camshaft mounted on the cylinder head, and a valve having a valve stem extending through the cylinder head, the valve actuating mechanism including a rocker arm having a first end and a second end, a universal pivot swingably supporting the first end of the rocker arm on the cylinder head of the engine, the second end of said rocker arm being in contact with the valve stem, and a cam on the overhead camshaft engaging from above a portion of said rocker arm intermediate said first and second ends to cause said rocker arm to swing about said pivot;

said universal pivot including a support socket mounted on said cylinder head the support socket having a part-spherical concave bearing surface, and a pivotable shaft mounted on the first end of the rocker arm, the pivotable shaft having a part-spherical convex end pivotally received in said part-spherical concave bearing surface; and said rocker arm spring being made of an elongated strip of resilient material bent into a substantially U-shaped leaf spring partly encircling said first end of the rocker arm, said spring having a lower arm engaged with said support socket and an upper arm formed with a center portion and a pair of opposite side edges and engaged with said rocker arm for urging said convex end of said pivotable shaft into contact with said bearing surface of said support socket and for biasing said other end of the rocker arm in contact with said valve stem;

said rocker arm spring being characterized in that the opposite side edges of said upper arm are bent at substantially right angles to the central portion along substantially longitudinal bending lines to increase the flexural rigidity of said upper arm such that the inherent natural frequency of said upper arm is increased beyond the frequency range of normal operation of said rocker arm so as to prevent premature failure of the spring due to excessive vibration caused by swinging movement of the rocker arm.

* * * * *

UNITED STATES PATENT AND TRADEMARK OFFICE
CERTIFICATE OF CORRECTION

PATENT NO. : 4,676,203

DATED : 30 June 1987

INVENTOR(S) : Yasushi NOUNO

It is certified that error appears in the above-identified patent and that said Letters Patent is hereby corrected as shown below:

Col. 3, line 37: change "ending" to --bending--.

Col. 3, line 46: change "ar" to --arm--.

Signed and Sealed this

Twentieth Day of October, 1987

Attest:

DONALD J. QUIGG

*Attesting Officer*   *Commissioner of Patents and Trademarks*